Oct. 29, 1940.                J. MONITI                2,219,452
                            FLOW DIRECTOR
                         Filed Aug. 2, 1939
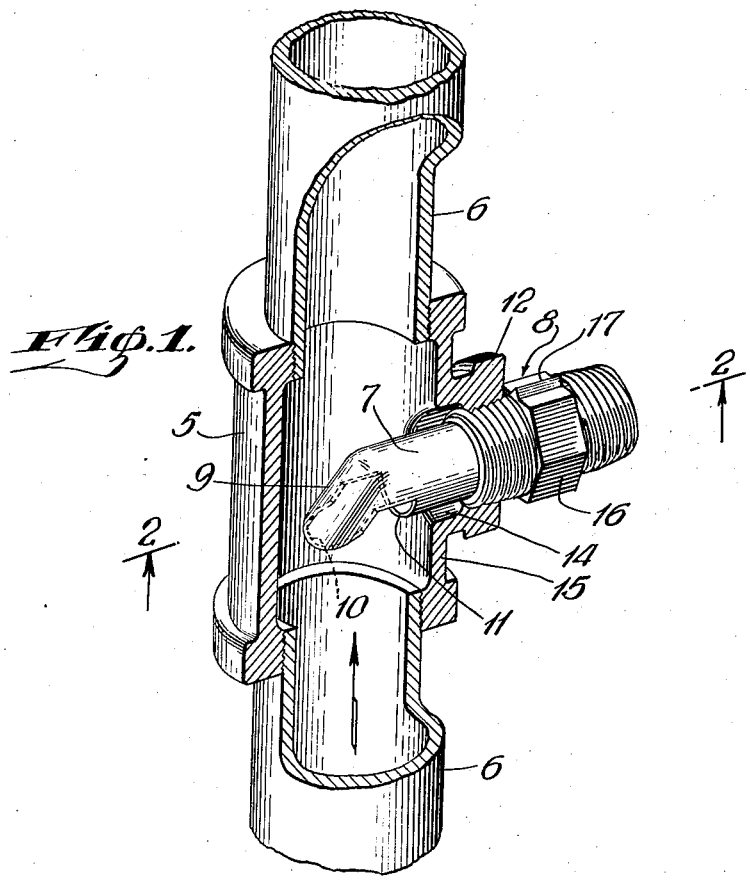
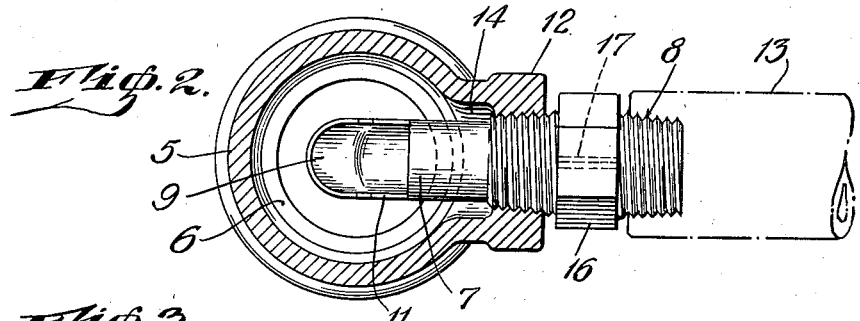
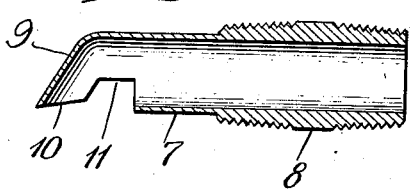
INVENTOR
John Moniti
BY George E. Hall
ATTORNEY Patented Oct. 29, 1940

2,219,452

UNITED STATES PATENT OFFICE 2,219,452

FLOW DIRECTOR

John Moniti, New Haven, Conn.

Application August 2, 1939, Serial No. 287,867

2 Claims. (Cl. 138—37)

This invention relates to a new and improved flow director of the type that is associated with a fluid conduit, and provides means to divert a portion of the fluid at an angle to the conduit.

An important object of the invention is to provide simple and economical mechanism of this character that may be readily connected with a conduit for a hot fluid, particularly water, whereby that portion of the fluid near the center of the stream is caused to move in a path at substantially a right angle thereto without materially affecting the flow of that portion of the stream adjacent to the inner walls of the conduit which continues its movement; another object being to utilize the water within the coupling to maintain the temperature of the water in the director while passing therethrough; and another object being to prevent water in the stream but outside of the core from entering the tube.

Other objects and advantages of the invention will be apparent during the course of the following description.

In the accompanying drawing forming part of this specification, and in which like numerals are employed to designate like parts;

Figure 1 is a fragmentary view of a fluid conduit with the improved director associated therewith;

Figure 2 is a transverse sectional view thereof, the parts in section being taken generally upon line 2—2 of Figure 1; and Figure 3 is a longitudinal detail sectional view of the director.

In the drawing, wherein for the purpose of illustration is shown a preferred embodiment of the invention, the numeral 5 designates a T or three-way coupling, into the opposite ends of which are threaded the pipes 6 and provided with a branch 12. A stream of hot water constantly passes through the pipes 6 and coupling 5 in the direction of the arrow in Figure 1.

The director consists primarily of a tube 7, having an externally threaded head 8 at one end and an angular wall 9 at the other end, the side wall of which near the angular wall 9 is cut away at 10 adjacent to a notch 11. The angular wall 9 may be longer than as shown in the drawing if desired. The head 8 of the tube may be a separate element and secured thereto instead of an integral part as shown.

The pipe threads on the head 8 provide means whereby the director may be secured in the branch 12 of the coupling and into a pipe 13, which may be connected with a radiator or the like.

As shown, the tube 7 extends through the internal chamber 14 of the branch 12 with the notch 11 at a point distant from the inner wall 15 of the coupling and the opening adjacent to the wall 9 is preferably directly over the core of the stream of water passing through the conduit. By this arrangement that portion of the stream of water near the center of the core thereof, which is not only the hottest portion of the stream but moves with the greatest velocity, is deflected into the director and through it to the pipe 13 aided by the angular wall 9. By this means the water adjacent to the walls of the pipes 6 and coupling 5, which moves slower than the core of the stream by reason of friction against the walls engaged thereby, is not disturbed but continues its movement, except where it engages the outer walls of the tube 7. This outer shell of water surrounds the exposed tube 7 not only within the coupling but in the chamber 14, thus utilizing the water in the conduit to maintain the water at its highest temperature as long as possible.

The notch 11 facilitates assembly of the director with the coupling 5 and also presents a wider opening or orifice in the side of the tube 7 to increase the volume of water presented to the interior thereof.

As shown, the angular wall 9 projects across the end of the tube 7 and below if it is desired to make the same longer. The water, therefore, enters the tube through the opening in one side thereof and is deflected inwardly by the wall 9. This wall counteracts any tendency of the water outside of the core or central portion and the adjacent wall of the coupling 5 to enter the tube 7, as it might have a tendency to do by suction or otherwise if not so prevented.

This invention is particularly adapted for use with a one-pipe hot water circulating system. In such case a portion of the water is conducted through the pipe 13 to a radiator or the like and is returned from the radiator by similar means through another coupling connected with the upper of the two pipes 6 at a point distant from the coupling 5. In such coupling the angular wall of the director is positioned in the same direction as the flow of the stream of water within the pipe, rather than against it.

While the head 8 is illustrated with a hexagonal portion 16, the same may be made round or other shape. A lug 17 or similar means upon the head 8 is fixed in line with the angular wall 9 to indicate the relative position of the wall and the adjacent opening when concealed within the coupling.

Having thus described the invention, I claim:

1. In the flow director, a T-coupling having its lateral branch threaded at its outer end portion and having its inner end portion formed with an annular chamber the inner end of which opens into the vertical passage of the coupling, and means for taking off water from the center of the coupling comprising a tube having a threaded part engaged with the threads of the branch of the T-coupling and having an intermediate portion extending inwardly from the said threaded portion with the periphery thereof spaced from the annular wall defining the said chamber, said tube having its inner portion extending into the vertical part of the T-coupling beyond the inner wall thereof and having a nose with an open bottom provided with sides connected by a downwardly directed front end which latter is disposed in approximately the central portion of the coupling passage, the sides of said nose each having a notch of substantially inverted U-shaped form, the front vertical walls of the notches being spaced from the downwardly directed front end of the nose and the rear vertical walls of the notches being spaced forwardly from the inner end of the chamber.

2. In a flow director, a T-coupling having its lateral branch threaded at its outer end portion and having its inner end portion formed with an annular chamber, the inner end of which opens into the vertical passage of the coupling, and means for taking off water from the center of the coupling comprising a tube having a threaded part engaged with the threads of the branch of the T-coupling and having an intermediate portion extending inwardly from the said threaded portion with the periphery thereof spaced from the annular wall defining the said chamber, said tube having its inner portion extending into the vertical part of the T-coupling beyond the inner wall thereof and having a nose with an open bottom provided with sides connected by a downwardly directed front end, which latter is disposed in approximately the central portion of the vertical coupling passage.

JOHN MONITI.